United States Patent [19]

Scaduto

[11] Patent Number: 4,621,861
[45] Date of Patent: Nov. 11, 1986

[54] CONVERTIBLE TOP FOR AUTOMOBILES

[76] Inventor: Onofrio Scaduto, 1623 S. 56th Ct., Cicero, Ill. 60650

[21] Appl. No.: 702,914

[22] Filed: Feb. 19, 1985

[51] Int. Cl.$^4$ .............................................. B60J 7/12
[52] U.S. Cl. .................................. 296/118; 296/107; 296/116
[58] Field of Search ............... 296/107, 108, 111, 116, 296/118, 121

[56] References Cited

U.S. PATENT DOCUMENTS

| | | | |
|---|---|---|---|
| 1,426,129 | 8/1922 | Velo | 296/107 |
| 1,981,060 | 11/1934 | Miller | 296/116 |
| 2,040,680 | 5/1936 | Westrope | 296/107 |
| 2,079,232 | 5/1937 | Smith | 296/116 |
| 2,785,922 | 3/1957 | Chika | 296/107 |

FOREIGN PATENT DOCUMENTS

| | | | |
|---|---|---|---|
| 175478 | 12/1952 | Fed. Rep. of Germany | 296/107 |
| 1505474 | 7/1969 | Fed. Rep. of Germany | 296/107 |
| 527071 | 5/1955 | Italy | 296/107 |
| 2086316 | 5/1982 | United Kingdom | 296/107 |

Primary Examiner—Robert B. Reeves
Assistant Examiner—Dennis H. Pedder
Attorney, Agent, or Firm—Baker, Maxham & Jester

[57] ABSTRACT

A convertible top structure for an automobile includes a foldable support bow foldable approximately the middle of the legs thereof which have upper and lower members foldable one-hundred and eighty degrees onto one another with a collapsible support linkage structure for supporting the bow in the upright position, including an elongated first support link pivotally connected to an automobile chassis and by means of a second link to the top portion of the bow with a pair of toggle links connected at one end to the lower end of the leg of the bow and at the other end to the elongated link member. A pliable sheet material covers the support frame forming a top structure having rearward extending wings.

18 Claims, 9 Drawing Figures

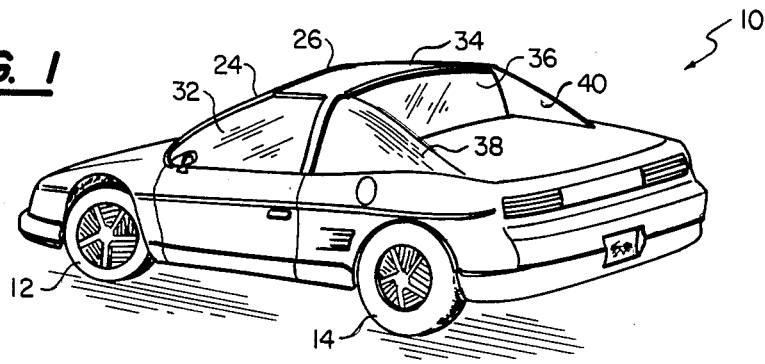
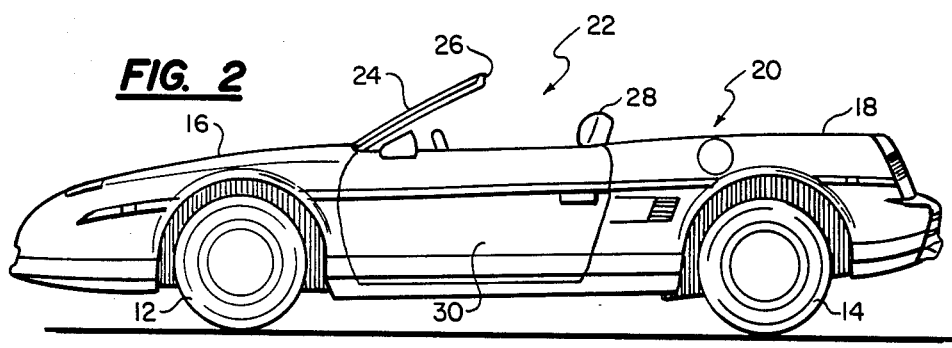
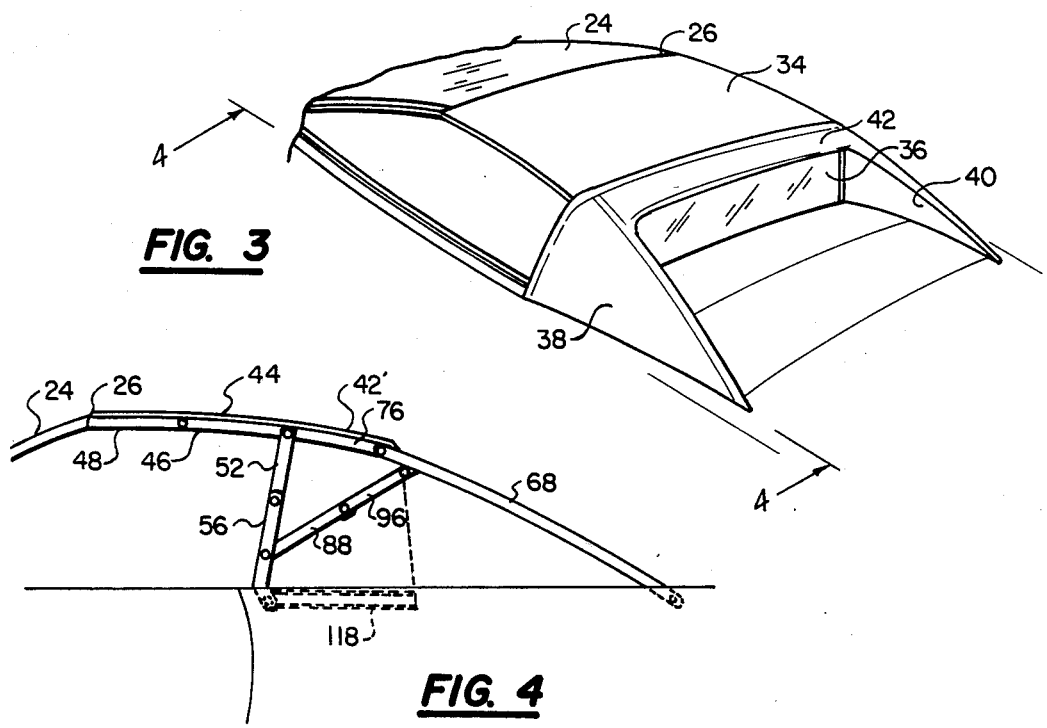

CONVERTIBLE TOP FOR AUTOMOBILES

BACKGROUND OF THE INVENTION

The present invention relates to automobile tops and pertains particularly to a compact collapsible convertible top structure.

Retractable convertible tops for automobiles have been around for substantially as long as the automobile has existed. The appearance of an automobile in both the top up and the top down positions is extremely important. For this reason, it is very important that the top when in the down position be fully retracted into a portion of the automobile body or is covered by a suitable covering of a desirable appearance. In either case, the space for storing the top is critical.

The present trend toward smaller automobiles that exist today makes storage space for convertible tops even more critical. This is particularly so for certain smaller vehicles such as the mid and rear engine vehicles. Many vehicles lack the necessary space for storing the coventional convertible top.

One such example of a vehicle with this problem is that of the Pontiac Fiero which is a mid-engine two seater automobile. For optimum appearance for a convertible version of this vehicle, the top must be foldable into a very narrow space. The vehicle is constructed such that the engine is positioned aft of the passenger compartment and in front of the rear wheels. The space existing in the body of such vehicles for the storage of a convertible top is extremely limited.

The present invention was conceived as a means for providing a very compact convertible top structure which can be accommodated in limited space available on many present day automobile vehicles.

SUMMARY AND OBJECTS OF THE INVENTION

It is therefore the primary object of the present invention to provide an improved convertible top structure for an automobile vehicle.

In accordance with the primary aspect of the present invention, a convertible top structure for folding into a compact storage space comprises a support bow that is pivotally mounted for extending into an upright support position having foldable legs for collapsing into a compact space and collapsible supported linkage disposed rearwardly of the support bow for supporting the bow in the upright position and comprising a pair of elongated first link members having outer end for pivotal attachment to an automobile chassis and an inner end pivotally connected by a pair of second links to the bow and a pair of toggle links connected at one end to the bow and at the other end to the inner end of the elongated first link.

BRIEF DESCRIPTION OF THE DRAWINGS

The above and other objects and advantages of the present invention will become apparent from the following description when read in conjunction with the drawings wherein:

FIG. 1 is a perspective view of an automobile incorporating the top in accordance with the invention;

FIG. 2 is a side elevation view of the vehicle of FIG. 1 with the top in the retracted stowed position;

FIG. 3 is a partial top perspective view of the vehicle of FIG. 1;

FIG. 4 is a side elevation view taken generally on lines 4—4 of FIG. 3;

DETAILED DESCRIPTION OF A PREFERRED EMBODIMENT

Figure 5:
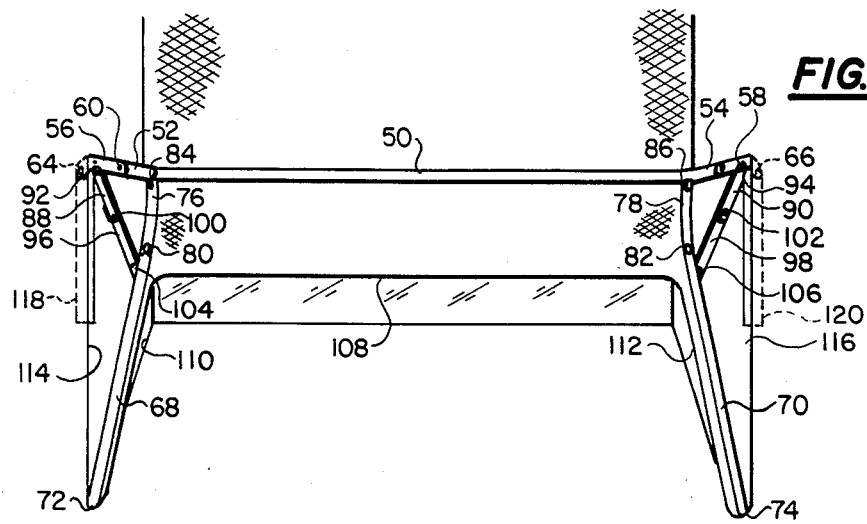
FIG. 5 is a top view with portions broken away showing the linkage of the present invention.

Referring to FIG. 1 of the drawing, there is illustrated an automobile which for illustrative purposes has the general configuration except for the top thereof of a Pontiac Fiero. The automobile designed generally by the numeral 10 comprises the usual chassis and body supported on a pair of front and rear wheels 12 and 14 respectfully. The body has a front end with a hood structure 16 and a rear deck structure 18. The engine for this vehicle is mounted in an area designated generally by the numeral 20 positioned just aft the driver or passenger compartment 22 and forward of the rear wheels 14. The passenger and operator compartment is protected by a wind screen 24 supported in a frame including a header 26. A seat back 28 defines generally the back portion of the operator or passenger compartment. A door 30 is hinged to the side of the chassis and provides means for entering and leaving the passenger compartment.

As illustrated in FIG. 1, the passenger compartment is enclosed by the chassis or body structure including two doors, the windshield 24, roll-up windows 32 and a top structure. The top structure in the illustrated embodiment is of my own design and includes a roof panel 34 supported at the forward end by the header 26 of the windshield and supported at the aft or rear end by the roof or top support linkage structure to be described. The top enclosure structure further includes a rear transparent window 36 preferably of a flexible transparent material supported and secured to flexible pliable material that is preferably impermeable or impervious, supported on the linkage structure that defines the general top configuration, including a pair of side wings 38 and 40 that extend rearward along the sides of the vehicle from the top.

The top structure is designed such that the roof panel 34 may be a flexible material identical with the remaining roof structure or be a separately removable panel. In a preferred embodiment as illustrated in FIG. 3, the panel 34 is removable as a separate substantially rigid self supporting roof panel. This may be designed to fit in and stow in the rear trunk as is done with some automobiles.

The basic linkage in both cases will be the same for the back part of the roof structure. The covering of the back part of the roof structure will likewise be substantially identical, with the exception that with the true convertible (soft top) configuration, a panel of flexible or pliable material will extend forward to cover the cockpit or passenger compartment. This fabric or flexible panel will be supported by forwardly extending frame members 46 and 48 which will extend to and be supported on the windshield header 26. With reference to FIG. 3, roof or frame linkage will be covered by a covering of the pliable material so as to form a roof structure having the general configuration as shown with the two wings 38 and 40 extending rearward along each side of the deck from the back window 36. The covering will form a rear covering portion 42 which extends across aft or behind the driver as to compartment and form a structure that may have somewhat the appearance of a roll bar such as those commonly referred to as Targa top.

Referring to FIG. 4, the soft top configuration is illustrated wherein a top panel 44 extends forward and is supported on a forward extending parallel linkage including member 46 and 48 which extend forward to be detachably connected and supported on the header 26 in a conventional manner. These two link members 46 and 48 should be about the same length as legs 52 and 56 of the bow 50. The linkages on the two sides of the car are essentially a mirror image of one another and extend substantially parallel to one another as will be seen from the subsequent illustration. The linkage 46 and 48 must of necessity be a two part link member foldable substantially at the center thereof so as to be accommodated in accordance with the invention in a compact space. The details of the covering and construction are of conventional construction to be consistent with the objects and structures of the present invention.

Figures 7, 9:
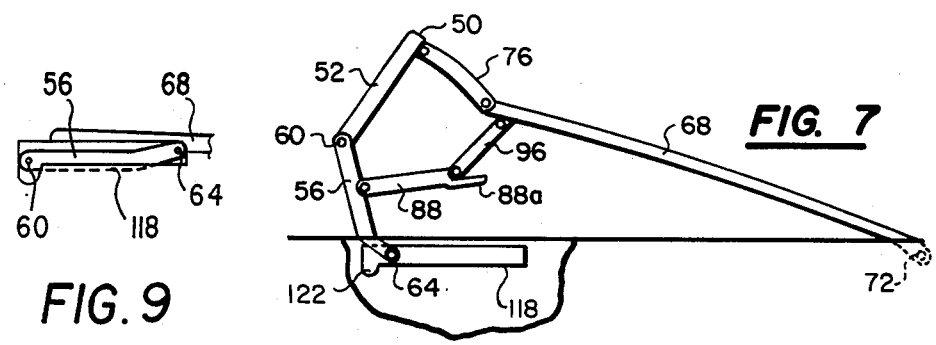
FIG. 7 is a view like FIG. 6 showing the linkage in an intermediate position of retraction.

The main linkages of the present invention are the same whether for the removable hard top version or the soft top version. With reference particularly to FIGS. 5–8, the main linkage comprises a support bow including cross member 50 which spans the operator/passenger compartment and legs on each end hereof in the form of upper legs 52 and 54 and lower legs 56 and 58. The lower legs are pinned or pivotally connected to the upper legs at a joint or knee 60 and 62 respectively. The lower end of the lower legs each include a curved back portion as shown in FIGS. 6–7 and is supported by rollers 64 and 66 in substantially horizontal tracks or channels 118 and 120 attached to the chassis of the vehicle just behind the passenger compartment. A detent 122 is formed in the forward end of each track 118 and 120 for engagement by rollers 64 and 66 for holding the lower ends of lower legs 56 and 58 in the forward upright portion (FIGS. 4 and 6). The upper and lower legs are of substantially the same length such that the overall bow can fold into a position to be stowed in a space having a width approximately one-half the height of the bow.

Support linkage for supporting the bow in the upright or extended position comprises a pair of spaced apart elongated generally longitudinally extending (longitudinally being generally parallel to the longitudinal axis of the automobile) link members 68 and 70. These are each pivotally connected by a pivot pin 72 and 74 to the chassis of the vehicle at the outer ends thereof. The inner ends of the links 68 and 70 are pivotally connected to a second pair of links 76 and 78 and pivot pins 80 and 82 with the second links 76 and 78 being pinned by pivotal pins 84 and 86 top portion of the bow 50 at the respective ends thereof. The links 76 may be slightly curved as can be seen for supporting a slight curvature in the roof structure.

The links 76 are preferably on the order of approximately the length of one of the upper and lower legs of the bow. The links 68 are preferably on the order of about twice the length of the combined length of the legs 52 and 56. The length of the links 68, 70, 76 and 78 determine the profile of the roof structure. Therefore, some latitude may be permitted for design purposes within proper geometric parameters.

A pair of toggle link assemblies each comprising respectively an inner link 88 and 90 pivotally connected by pins 92 and 94 to the lower legs 56 and 58 of the bow 50. Linkages 88, 96 and 90, 98 are substantially equal in length to each of the legs 52, 56 and 54, 58 of the bow. Outer links 96 and 98 are pivotally connected at a common joint 100 and 102 to the inner link and by a pivot 104 and 106 to the elongated links 68 and 70 near the inner end thereof. The geometry of the linkage is selected to provide the desired roof structure profile as well as the desired foldable compact arrangement that will be appreciated from the subsequent description.

Figure 8:
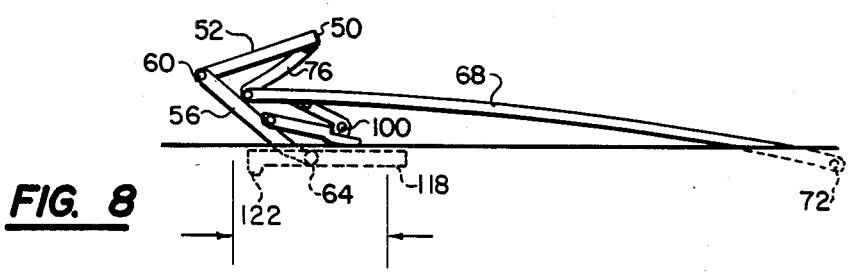
FIG. 8 is a view like FIG. 6 showing the linkage in a further position of retraction; and, FIG. 9 is a partial view like FIG. 8 showing the linkage in a fully retracted position

With reference to FIGS. 6–9, it can be seen that the linkage can fold down into a space such that the transverse or rear top portion including the rear window can fit substantially in a space that is approximately the length of one of the legs 52 of the bow. The soft top version (FIG. 4) can also fit into this space with the forward top portion 44 folding with links 46 and 48 on top of the rear roof portion 42'. With the arrangement as illustrated, the bow folds backwards with the lower end of the lower leg sliding along the tracks 118 and 120 and the knee 60 extending forward with the toggle linkage 88, 96 folding backward, and the upper linkage 50, 76 folding downward with the link 76 folding back onto the elongated links 68 and 70 and beneath the top portion and inside the bow 50. With particular reference to FIGS. 8 and 9, the leg members 52 and 56 of the bow fold over about the pivot or hinge pin 60 approximately one-hundred and eighty degrees to lie generally flat or essentially parallel to form a compact arrangement as shown.

Referring to FIGS. 5–8, it can be seen that the linkages fit within the limits of the length of one-half the length of the bow and therefore fold within and lie substantially within a horizontal plane. The top structure preferably fits slightly below the rear deck as seen in FIG. 2 and can be covered by a flush body panel. Alternately, it can extend slightly above the deck and can be covered by the usual fabric cover.

Figure 6:
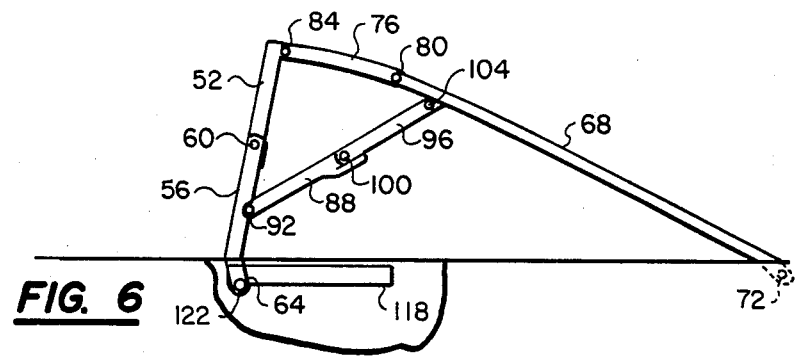
FIG. 6 is a detailed side elevation view of the linkage of the present invention in the extended position.

The opening within the upper surface of the body structure of the rear deck for accommodating the top structure is apparent from viewing FIG. 5. With this arrangement, the rear deck surface extends forward to a forward edge 108 where the lower edge of the window 36 is attached to the chassis. The side slots or cavities for the respective portions of the top are defined by inner edges 110 and 112 and outer edges 114 and 116. These form a rather V-shaped slot at each side of the deck for accommodating the wings of the top structure and rearward extending portion of the linkage. The arrangement and mounting of the linkage and top can be such that the top is attached to the inside edges of the deck perimeters 110, 112, 114 and 116 and can extend downward below the surface of the deck. The deck surfaces can then be covered by the usual fabric panels such as vinyl or the like or may be covered by metal or other suitable rigid panels for the top down configuration as shown in FIG. 2.

As an alternate construction, the deck can be left uncut such that the mounting of the roof structure is entirely on the top surface of the deck such that a top folds down on top of the deck and may then be covered by a canvas cover or the like as in many convertibles. The perferred construction however is as previously mentioned wherein the entire top and linkage structures fold down at least partially beneath the deck as shown in FIG. 2.

While I have illustrated and described my invention by means of specific embodiments, it is to be understood that numerous changes and modifications may be made therein without departing from the spirit and scope of the invention as defined in the appended claims.

I claim:

1. A convertible top structure foldable for storage into a compact space comprising:
   a support bow comprising a cross member having a pair of legs, each leg having a hinge intermediate the ends thereof, said bow pivotally mounted for extending into an upright support position and said legs are each foldable about one-hundred eighty degrees about said hinge for collapsing into a retracted position for stowage in a space; and
   collapsible supporting linkage disposed rearward of said support bow for supporting said bow in the upright support position, and comprising a pair of elongated first link members each having an outer end for pivotal attachment to an automobile chassis and an inner end pivotally connected by a respective second link to said bow, and a pair of toggle linkages, each linkage connected at one end to said bow and at the other end to the inner end of said elongated first links.

2. A top structure according to claim 1 wherein the legs of said bow are foldable at approximately the center of the length thereof defining an upper leg and a lower leg of substantially equal length.

3. A top structure according to claim 1 wherein the length of one said first and said second link members is about two times the length of a leg of said bow.

4. A top structure according to claim 1 wherein the length of said toggle linkage is about equal to a leg of said bow.

5. A top structure according to claim 1 comprising a covering of impermeable pliable material supported by said bow and support linkage and defining a top surface and a pair of rearward extending wings when in the upright position.

6. A top structure according to claim 5 wherein said top surface is a rear top surface extending rearwardly from said bow and covering said second links.

7. A top structure according to claim 6 wherein said top structure surface includes forwardly extending link members for extending to a windshield header for support thereon and for covering a passenger compartment.

8. A top structure according to claim 2 comprising a pair of spaced apart longitudinally extending tracks; and
   a roller on a lower end of each of said lower legs for engaging and following said tracks upon raising and lowering said top structure.

9. A top structure according to claim 8 comprising a detent in the forward end of each of said tracks for retaining the lower end of said lower legs in a forward position for retaining said top structure in an upright position.

10. A top structure according to claim 9 comprising a covering of impermeable pliable material supported by said bow and support linkage and defining at least a rear top surface extending generally downwardly and rearwardly from said bow and covering said second links.

11. A top structure according to claim 10 wherein said top structure includes forwardly extending collapsible link members for supporting a forwardly extending covering for extending over the passenger compartment.

12. A convertible top structure for the passenger compartment of an automobile vehicle, comprising:
    a foldable bow having a pair of collapsible legs defined by an upper leg and a lower leg of about equal length pivotally connected together for folding over about one-hundred eighty degrees onto one another to a compact arrangement, said bow being pivotally mounted at the lower end of the lower legs to an automobile chassis;
    a collapsible folding linkage assembly connected to said bow for selectively holding said bow in an upright position and folding with said bow to a retracted stoweable position, said linkage assembly comprising a pair of elongated first link members, each having an outer end pivotally connected to an automobile chassis and an inner end pivotally attached to one of a pair of second link members which are pivotally attached to said bow, and a pair of toggle linkages, each pivotally attached at one end to said bow and at the other end to one of the elongated link members at an inner end thereof.

13. A top structure according to claim 12 wherein said first link members each exceed the length of one of said upper and lower legs of said bow; and
    said toggle linkage is about equal in length to a combined upper and lower leg.

14. A top structure according to claim 13 comprising a pliable impervious covering extending over said bow and said second link members and defining at least a rear extending top surface from said bow.

15. A top structure according to claim 14 comprising forwardly extending parallel linkage means connected to said bow and extending forwardly for supporting a forwardly extending covering for covering a passenger compartment.

16. A top structure according to claim 15 comprising pliable means covering said first and said second link members for defining a pair of aft extending wings when said bow is in an upright position.

17. A top structure according to claim 16 comprising track means for supporting the lower ends of said lower legs for moving to a forwardmost position for said upright position, and for moving to a rearmost position for said stowable position.

18. A convertible top structure for an automobile vehicle, comprising:
    a pair of spaced apart horizontally disposed longitudinally extending generally parallel tracks having a forward end and a rear end;
    a top support bow having a pair of spaced apart foldable legs each defined by an upper leg and a lower leg pivotally connected to said upper leg and said lower leg including a roller at the lower end thereof mounted in a separate one of said tracks, the lower end of said lower legs moveable to the forward end of said tracks for holding said bow in an upright position and moveable to the rear end of said tracks for holding said bow in a collapsed lowered position;
    a collapsible support linkage assembly disposed aft of said bow and comprising a pair of elongated first link members each having an outer end pivotally attached to a vehicle body and an inner end attached to one end of a second link that is pivotally attached to said bow at the top of the legs thereof, and a pair of toggle linkages each connected at one end to a lower leg of said bow and at the other end to an inner end of one of said first links; and a pliable material covering said bow and said linkage assembly for defining at least a top surface extending to the rear of said bow and a pair of spaced apart rearwardly extending wings when said bow and said linkage assembly are in the upright position.

* * * * *